United States Patent [19]

Fischer

[11] Patent Number: 4,765,740

[45] Date of Patent: Aug. 23, 1988

[54] OPTICAL APPARATUS BASED ON MEASUREMENT OF PHASE OR FREQUENCY SHIFT OF AN OSCILLATING BEAM, PARTICULARLY USEFUL AS AN OPTICAL GYRO

[75] Inventor: Baruch Fischer, Neve Shaanan, Israel

[73] Assignee: Technion Research & Development Foundation Ltd., Technion, Israel

[21] Appl. No.: 821,783

[22] Filed: Jan. 23, 1986

[30] Foreign Application Priority Data

Feb. 8, 1985 [IL] Israel .......................... 74284

[51] Int. Cl.$^4$ .......................... G01C 19/64; G01B 9/02
[52] U.S. Cl. .................................................. 356/350
[58] Field of Search .......................................... 356/350

[56] References Cited

U.S. PATENT DOCUMENTS 4,410,275 10/1983 Shaw et al. ..................... 356/350
4,659,223 4/1987 Huignard et al. ................ 356/350

OTHER PUBLICATIONS

"New Optical Gyro Based on the Ring Passive Phase Conjugator", Fischer et al., Applied Physics Letters, 7-1985, pp. 1-3.
"Image Transmission and Interferometry with Multimode Fibers using Self-Pumped Phase Conjugation", Fischer et al., applied Physics Letters, 1-1985, pp. 113-114.
"Coherent Oscillation by Self-Induced Grating In The Photorefractive Crystal BaTiO$_3$", White et al., applied Physics Letters, 3-1982, pp. 450-452.

Primary Examiner—Davis L. Willis
Assistant Examiner—S. A. Turner
Attorney, Agent, or Firm—Benjamin J. Barish

[57] ABSTRACT

Optical apparatus, particularly useful as an optical gyro for measuring rotation, comprises a light source, an optical system defining a closed-loop optical path, an optical-wave-mixer producing form the light source beam an oscillating beam in the closed-loop optical path, and a circuit for measuring the phase or frequency shift produced in the oscillating beam by the optical-wave-mixer resulting from the non-reciprocal or reciprocal phase-shift thereof. A mathematical analysis is set forth showing how the non-reciprocal phase-shift is related to the frequency shift, so that the frequency shift provides a measurement of the non-reciprocal phase-shift, which depends on the rotation of the closed-loop ring optical path, thereby enabling the apparatus to serve as an optical gyro.

30 Claims, 5 Drawing Sheets

OPTICAL APPARATUS BASED ON MEASUREMENT OF PHASE OR FREQUENCY SHIFT OF AN OSCILLATING BEAM, PARTICULARLY USEFUL AS AN OPTICAL GYRO

BACKGROUND OF THE INVENTION

The present invention relates to optical apparatus based on measurement of phase or frequency shift of an oscillating beam. The invention is particularly useful as an optical gyro for measuring rotation, and is therefore described below especially with respect to this application, but it may also be used in other applications, e.g., other phase interferometers, as a magnetic field measuring instrument, and as a frequency shifter.

Optical rotation sensors or gyros are based on the Sagnac effect, in which an optical beam propagated through a closed-loop optical path subjected to rotation produces an optical path difference proportional to the rotation rate. Current optical gyros are mostly divided into two categories, namely; passive fiber gyros and active laser gyros. In the passive fiber gyro, rotation causes a non-reciprocal optical path and phase difference to arise between counter-propagating beams in the ring of a Sagnac Interferometer. Significant phase difference can only be achieved with a long fiber ring. Even then, the phase difference is very small. For this reason, all other non-reciprocal phase sources must be identified and eliminated. This usually dictates, for example, the use of a single mode fiber of a single polarization to insure complete reciprocity at rest. In the active laser gyro, the non-reciprocal optical length of a ring produces different frequencies for counter-propagating beams in an active ring laser cavity. This gyro also suffers from unwanted non-reciprocal contributions, in addition to frequency "lock in" at low rotation rates.

Modal dispersion in multimode optical fibers is the main cause for the distortion of an optical field that is transmitted through the fiber. Thus, imaging and any detection scheme requiring phase sensing, such as interferometry, are difficult to achieve in multimode fibers.

OBJECTS AND BRIEF SUMMARY OF THE INVENTION

A main object of the present invention is to provide optical apparatus particularly useful as an optical gyro for measuring rotation and other phase interferometers. Another object of the present invention is to provide optical apparatus that may also be used for measuring magnetic field intensity, and also for shifting and modulating frequency and intensity.

According to a broad aspect of the present invention, there is provided optical apparatus comprising; an optical system defining a closed-loop optical path; a light source producing a single pumping beam outside said closed-loop optical path; an optical-wave-mixer producing from said single pumping beam an oscillating beam in said closed-loop optical path; and means for measuring the frequency shift produced in said oscillating beam by said optical-wave-mixer resulting from the non-reciprocal or reciprocal phase-shift thereof.

A mathematical analysis is set forth below for one ring configuration showing how the non-reciprocal phase-shift is related to the frequency shift, so that the frequency shift will provide a measurement of the non-reciprocal phase-shift. Since the latter depends on the rotation of the closed-loop ring optical path, the apparatus may therefore serve as an optical gyro.

Preferably, the invention uses phase conjugate mirrors, and therefore one of the preferred embodiments of the invention described below may be more particularly called a ring passive conjugate gyro (Ring PPC Gyro). It is based on a ring passive phase conjugator, in which self-induced gratings in a photorefractive four-wave mixer produce the phase conjugate forms of an input beam and probe beam which are linked by the ring. The structure and operation of phase conjugate mirrors are more particularly described in U.S. Pat. No. 4,529,273 filed Dec. 21, 1982, and the references therein cited. The broader aspects of the invention, however do not require the use of phase conjugate mirrors.

It will be seen from the mathematical analysis, as set forth below, that the measured frequency shift also depends on the electric and magnetic fields. Accordingly, the optical apparatus could include means for deriving from the measured frequency shift a measurement of the magnetic field to which the closed-loop ring is subjected, in which case the apparatus could serve as a magnetic field measuring instrument. Another embodiment of the invention, therefore, is a novel magnetic field measuring instrument. A still further embodiment of the invention is a frequency shifter.

The above scheme and other configurations which will be described, allow the operation of interferometers, based on phase modulation, utilizing multimode fibers. Unlike regular phase conjugators, the passive phase conjugate mirrors are partial phase conjugators of the nonuniform phase of the field. Since the pump beam is internally generated in the PPCM, it carries the same uniform phase as the information-bearing probe beam. On the other hand, nonuniform phases arising from modal dispersion in fibers or other distortions is conjugated, and cancelled out.

Further features, advantages and applications of the invention will be apparent from the description below.

BRIEF DESCRIPTION OF THE DRAWINGS

The invention is herein described, by way of example only, with reference to the accompanying drawings, wherein:

FIGS. 3, 4 and 5 and 6 diagrammatically illustrate three further embodiments of the invention.

THE PREFERRED EMBODIMENT OF FIG. 1

Figure 1:
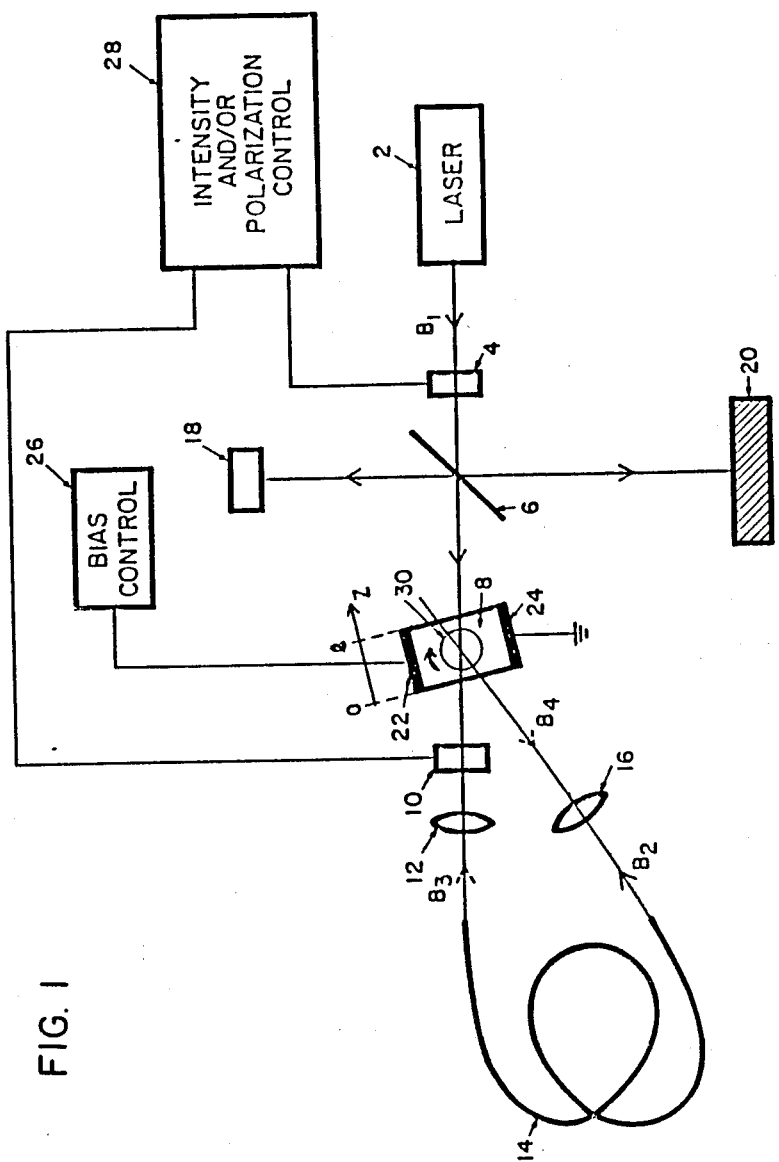
FIG. 1 diagrammatically illustrates a ring passive conjugate gyro (Ring PPC Gyro) constructed in accordance with the present invention, and used as a basis for the mathematical analysis set forth below.
Figure 2A:
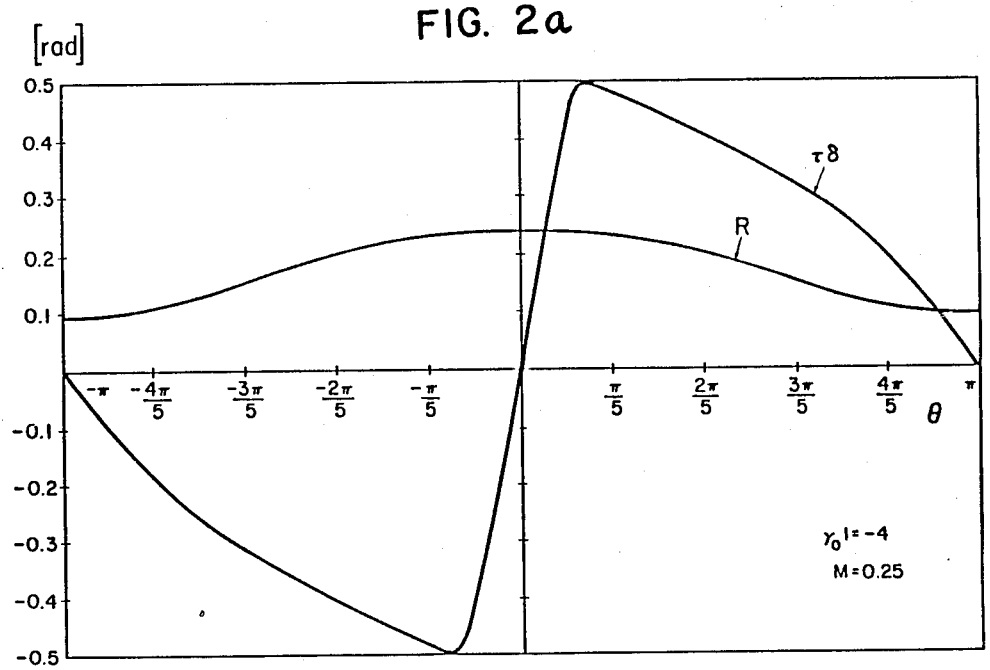
FIGS. 2a–2d are curves helpful in understanding the mathematical analysis set forth below.
Figure 2B:
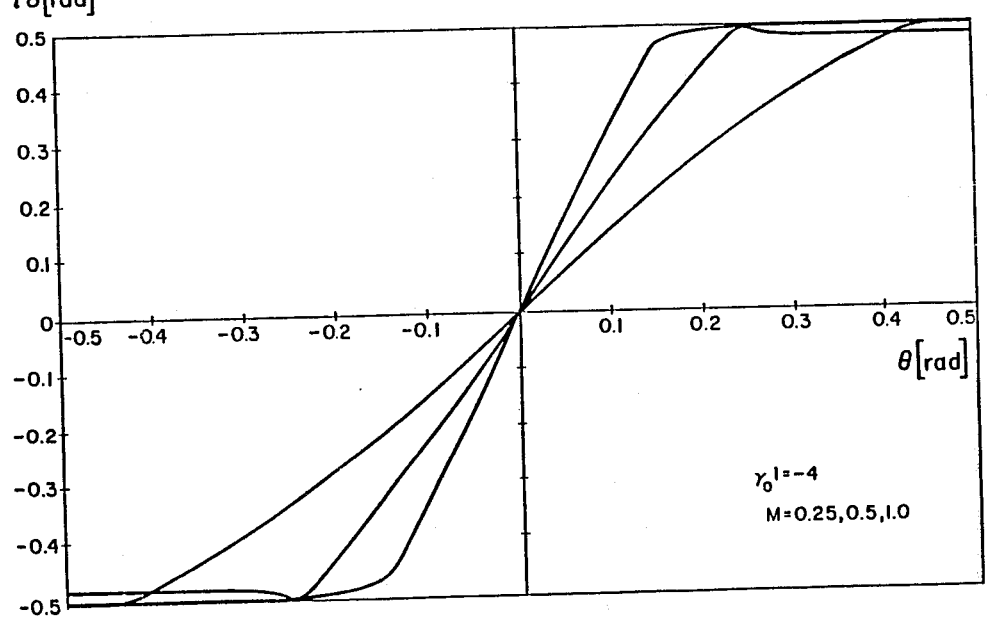
Figure 2C:
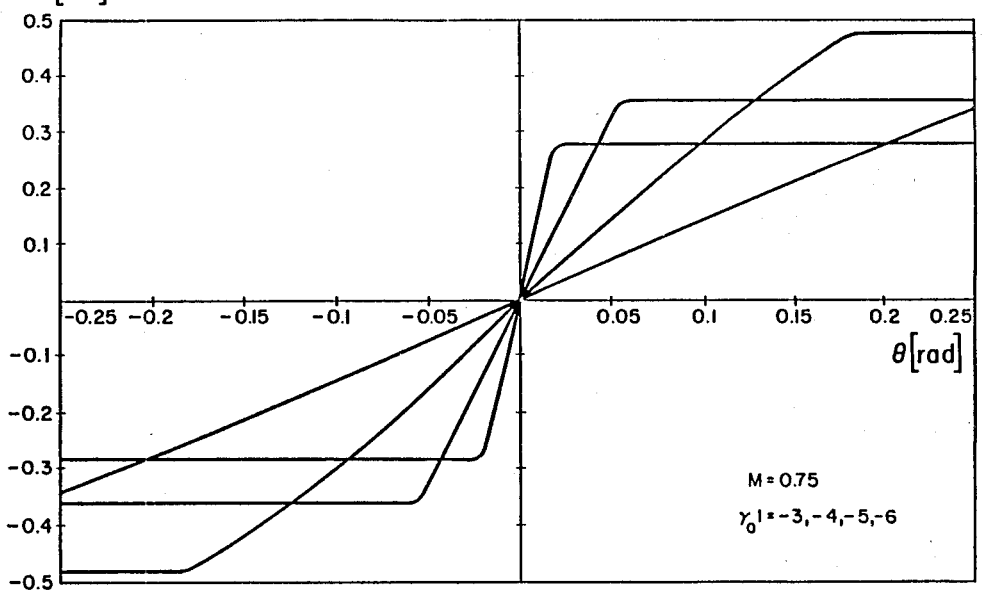
Figure 2D:
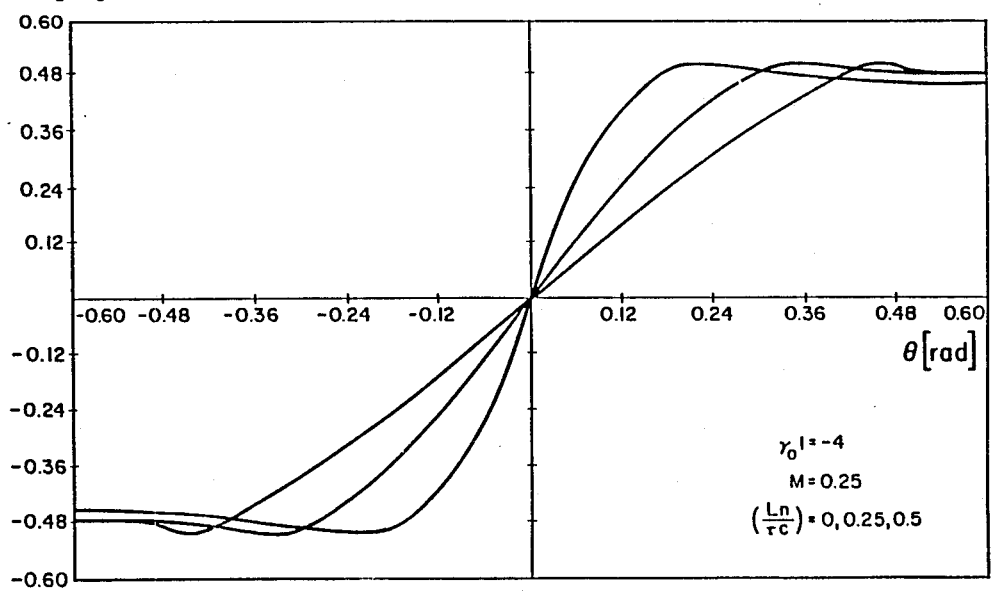

As indicated earlier, the preferred embodiment of the invention illustrated in FIG. 1 is a Ring PPC Gyro using a four-wave mixer. Thus, the illustrating apparatus includes a laser 2 producing a single pumping or source beam which passes through an intensity and/or polarization control unit 4 and a beam-splitter 6 into a four-wave mixer 8, in the form of a non-linear photorefractive crystal. The input beam $B_1$ from laser 2 exits from the opposite side of crystal 8 and passes through another intensity and/or polarization control unit 10 and a coupling lens 12 to a fibro-optic ring 14. The latter reintroduces the beam as beam $B_2$ via another coupling lens 16.

Fiber-optic ring 14 thus defines a closed-loop optical path, and crystal 8 serves as an optical-wave-mixer producing from the beam of laser 2 an oscillating beam in this closed-loop optical path. In the embodiment of FIG. 1, crystal 8 is a four-wave mixer and produces, with the fiber-optic ring 14, two counter-propagating oscillating beams. Thus, beams $B_1$ from laser 2, and beam $B_2$ reintroduced from fiber-optic ring 14, constitute the two input beams, whereas beams $B_3$ and $B_4$ generated within crystal 8 constitute the counter-propagating oscillating beams; beam $B_3$ is a phase conjugate of input beam $B_1$, and beam $B_4$ is a phase conjugate of input beam $B_2$.

The mathematical analysis set forth below shows that the non-reciprocal phase-shift in the counter-propagating beams is related to the frequency shift produced in these beams, so that measuring the frequency shift will provide a measurement of the non-reciprocal phase-shift, and thereby a measurement of the rotation of the optical system, which depends on the non-reciprocal phase-shift. In the system illustrated in FIG. 1, the frequency shift is detected in detector 18, which receives a portion of oscillating beam $B_3$ as reflected thereto via beam-splitter 6, and a portion of the incident beam $B_1$ which is reflected thereto from mirror 20 and beam-splitter 6. Thus, the frequency shift between the latter two beams, which may be detected in detector 18 by a conventional interference technique, provides a measurement of the non-reciprocal phase-shift in the optical system, and thereby a measurement of the rotation thereof.

Although the system illustrated in FIG. 1 is particularly useful as an optical gyro for measuring rotation, the mathematical analysis set forth below also shows that it is useful for measuring magnetic field intensity and also for shifting frequency. Particularly for the latter applications, but also for the gyro-biassing, crystal 8 is provided with a pair of opposed electrodes 20, 22, connected to a bias control circuit 24 for varying the electrostatic field applied to the crystal by these electrodes. In addition, the intensity control units 4 and 10 are connected to an intensity control circuit 28 for varying the intensity of the incident beam.

SCIENTIFIC ANALYSIS

Set forth below is a mathematical analysis which shows that a non-reciprocal phase-shift in the closed-loop ring optical path defined by the fiber-optic coil 14 and crystal 8 gives rise to a detemined movement of the grating in the four-wave mixer crystal 8. This, in turn, results in a self-frequency detuning of the generated counter-propagating oscillating beams $B_3$, $B_4$. There is thus produced an active-like gyro effect, but the detuning originates from the mixing crystal activated by the non-reciprocity in the ring. The amount of detuning or frequency shift can therefore be measured to provide a measurement of the rotation of the optical system, as in an active optical gyro.

Reasonable rotation sensitivity is obtained by the use of a long fiber ring 14, as in a fiber gyro. The natural "time reversal" properties of phase conjugation eliminate much of the reciprocity problems of the fiber gyros and allow the use of a multimode fiber for ring 14. Since the device illustrated in FIG. 1 is based on self-pumped four-wave mixing, it does not impose a strict coherence requirement on the laser, and a variety of adjustable parameters, e.g., bias control 26 and intensity and/or polarization control 28 in FIG. 1, are available for controlling and biasing the device.

A partial theoretical study of this system in a degenerate case has been described in an earlier work (M. Cronin-Golomb, B. Fischer, J. O. White and A. Yariv, IEEE J. of Quantum Electronics, QE-20, 12, 1984). However, the possibility of non-degenerate behavior in the passive four-wave mixer, was not accounted for.

A detailed analysis of the ring PPCM gyro is described in a paper by B. Fischer and S. Sternklar (Appl. Phys. Lett. 47, (1985). Other configurations of photorefractive oscillators—the linear, semilinear—the two interaction region PPCMs and the uni and double directional ring oscillators, are analyzed in two papers submitted to Optics Letters (B. Fischer; S. Sternklar, S. Weiss and B. Fischer, 1985). The dependence of the detuning on reciprocal and nonreciprocal phases, beams intensities an polarization, mixing efficiency, the crystal and beam' angles, losses and electric fields in the crystal is described. An analysis of the ring PPCM is described below.

A detailed general analysis of non-degenerate four-wave mixing shows that the non-degeneracy may be included in all the expressions of the Cronin-Golomb et al. article, supra, by allowing the coupling constant to be complex. It will be shown that the crystal, through a complex, provides for a self-adjusting phase lag of the grating with respect to the fringes. Thus, a complete general analysis necessitates dealing with phases and amplitudes rather than intensities of the beams. The following mathematical analysis makes use of the exact solution summarized in the above Cronin-Golomb et al. article for transmission gratings, where the beams were taken to be plane waves and absorption was neglected.

The boundary conditions of the PPC for the amplitudes $A_i$ of the beams at the faces $z=0$ and $z=l$ of the photorefractive crystal are:

$$A_2(z = l) = A_2(l) \tag{1}$$

$$\frac{A_1(0)}{A_3(0)} = m \tag{2a}$$

$$\frac{A_4(0)}{A_2(0)} = \tilde{m} \tag{2b}$$

where $m = \tilde{m}$, unless a non-reciprocal phase of $\theta/2$ exists in the fiber linking the beams. Then $m\tilde{m} = |m|^2 e^{i\theta} = Me^{i\theta}$.

The following equations are derived in a manner similar to that of the above Cronin-Golomb et al. article:

$$m_1 = \frac{T + Q}{m_2[(\Delta + B)T + Q]} \tag{3}$$

$$r = -\frac{(\Delta + 1)T}{m_2[\Delta T + Q]} \tag{4}$$

where
$r = A_3(0)/A_4^*(0)$, $m_1 = A_1(0)/A_2^*(0)$, $m_2 = A_2^*(l)/A_1(l)$, $R = 1/|m_1|^2$ is the reflectivity of the device, $Q = [\Delta^2 + (\Delta + 1)^2 R]^{\frac{1}{2}}$, $T = \tan h[(\gamma l/2)Q]$, $B = (1 + \Delta)R$, $\Delta = (1 - M)/(1 + M)$ is the normalized light power flux in the crystal, $l$ is the width of the crystal, and $\gamma$ is the coupling constant that depends on several parameters of the mixing crystal.

The possibility of nondegenerate frequencies in our device means that the connected oscillating beams $A_3$ and $A_1$ are detuned by $\delta$ with respect to the given frequency of the input $A_2$ and $A_4$. The dependence of $\gamma$ on the detuned frequency arises because of the finite response time of the gratings built up in the crystal. The efficiency of the moving grating is deteriorated and it lags in phase with respect to the fringes as $\delta$ is increased.

We will assume the following dependence of $\gamma(\delta)$ $$\gamma(\delta) = \gamma_o/[1 + i(\tau\delta)] \quad (5)$$

Different or more precise expressions[7] for $\gamma(\delta)$ will not change our basic results. $\tau$ is the response time of the crystal, and depends on several parameters. For a given crystal its dependence on the total beam power is important. It is approximately scaled inversely with power density. For $BaTiO_3$, $\tau \sim (10/I)$ seconds, where I has units $mW/mm^2$. The detuned frequency and the reflectivity of the device can be found by noting that $$\frac{m_1}{r} = m\bar{m}^* = Me^{i\nu} \quad (6)$$

where $\theta$ is any non-reciprocal phase in the ring, M is the ring's transmittance, and comparing it to the ratio given by equations 3 and 4, $$\frac{(T+Q)(\Delta T + Q)}{[(\Delta + B)T + Q](\Delta + 1)T} = -Me^{i\nu} \quad (7)$$

Figure 3:
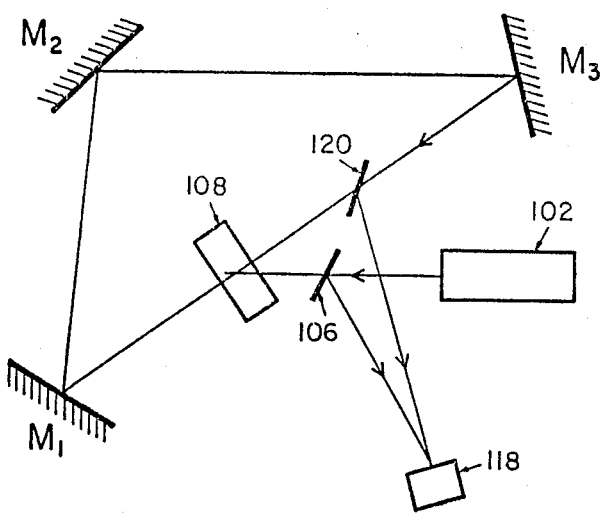
Figure 4:
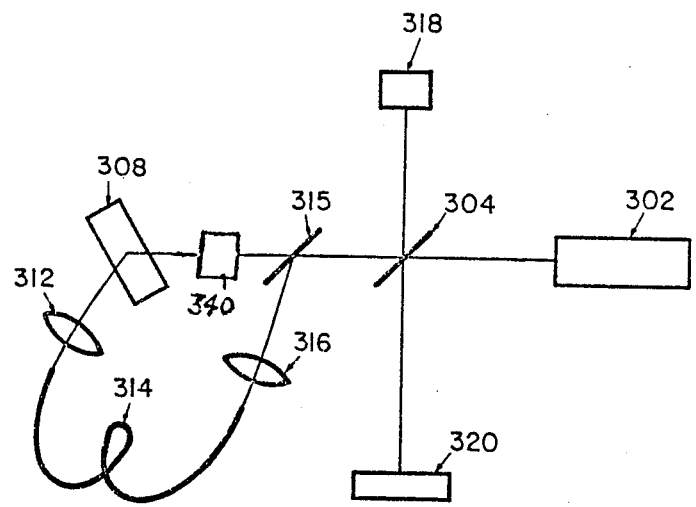

The equation is solved numerically for the reflectivity R and the normalized self-detuning ($\tau\delta$) as functions of $\theta$. Typical plots are shown in FIG. 2. Our main interest here is in the $\delta(\theta)$ behavior, which is the measurable quantity of the non-reciprocal phase, or the rotation rate. Fortunately, around $\theta=0$ its behavior is nearly linear. In FIGS. 3 and 4 the linear region is enlarged and plots of ($\delta\tau$) are shown for $\gamma_o l = -4$ and varying M, and for $M = 0.75$ and varying $\gamma_o l$. The slope and sensitivity is larger for larger M (less loss in the ring) and larger absolute values of $\gamma_o l$ (greater coupling in the crystal). The reflectivity R is almost constant, $R \approx M$ in this region. In all of the graphs we observe sharp transition of the slope at the edges of the linear region.

An expression for $\tau\delta(\theta)$ in the linear region can be easily derived from Eq. 7

$$(\tau\delta) \approx a\theta \quad (8)$$

where $$a \approx \frac{\tanh(\gamma_o l/2)}{\left(\frac{\gamma_o l}{2}\right)\left[1 - \tanh^2 \frac{\gamma_o l}{2}\right]\frac{M}{M+1}}$$

We approximated $R \approx M$, valid for large ($\gamma_o l$) (which has a minimum threshold[3] value of 1 at $M = 1$ and increases for lower M).

Using the Ring PPC as a gyroscope for different regimes of rotation rates depends on the crystal time constant $\tau$ and the ring area (or equivalently its diameter and total length). Significant nonreciprocal phase shifts due to rotation may be obtained by long fibers as in fiber gyros. The $\theta$ dependence on the rotation rate $\Omega$ for a ring consisting of a coil of fibers of total length L and diameter D is given by $$\theta = \left(\frac{2\pi LD}{\lambda_o c_o}\right)\Omega \quad (9)$$

where $\lambda_o$ and $c_o$ are the wavelength and velocity of light in vacuum. Thus we obtain $$\delta = \frac{a}{\tau}\left(\frac{2\pi LD}{\lambda_o c_o}\right)\Omega \quad (10)$$

For typical values of $\lambda_o = 0.5$ $\mu$m, $D = 0.25$ m, we have $$\delta \approx \left(\frac{al}{\tau}\right) \times 10^{-2}\Omega \quad (11)$$

Since $a \sim 1$, is order to measure small rotation rates on the order of $10^{-6}$ rad/sec ($\sim 10^{-2}$ times earth rotation rate—a requirement in navigational applications) with a detuning of $\delta \sim 10$ rad/sec, we must have $(L/\tau) \sim 10^9$. Thus for a fiber length of $10^3$ m, $\tau \sim 10^{-6}$ sec. Small time constants of this order of magnitude may be achievable, for example, in photorefractive semiconductors. When the coupling efficiency of these semiconductors will improve, integration with semiconductor lasers will be an attractive option.

For higher rotation rates some commonly available photorefractive materials may be adequate. We emphasize here the possibility of tuning the $\tau$ of a specific material by the laser light power density, as was mentioned earlier.

In cases where long fiber lengths are needed for the ring, another factor may be of importance, namely the cavity dependent asymmetry due to the detuning:

$$\theta' = L\delta/c \quad (12)$$

Here $c = c_o/n$, where n is the index of refraction of the fiber. Comparing $\theta'$ to $\theta$ of Eq. 9 shows that when $\delta \gtrsim \delta_o = (\pi D/\lambda_o n)\Omega$, $\theta'$ is significant. For $D = 0.25$ m, $\lambda_o = 0.5$ $\mu$m and $n = 1.5$, $\delta_o \sim 10^6 \Omega$. Therefore, only for very small rotation rates on the order of $\Omega \sim 10^{-6}$ rad/sec, must $\theta$ be renormalized by adding $\theta'$ to it. Then, in Eq. 7, we must substitute $$\theta \to \theta + \theta^1 = \theta + \left[\frac{Ln}{\tau c}\right](\tau\delta) \quad (13)$$

Figure 5:
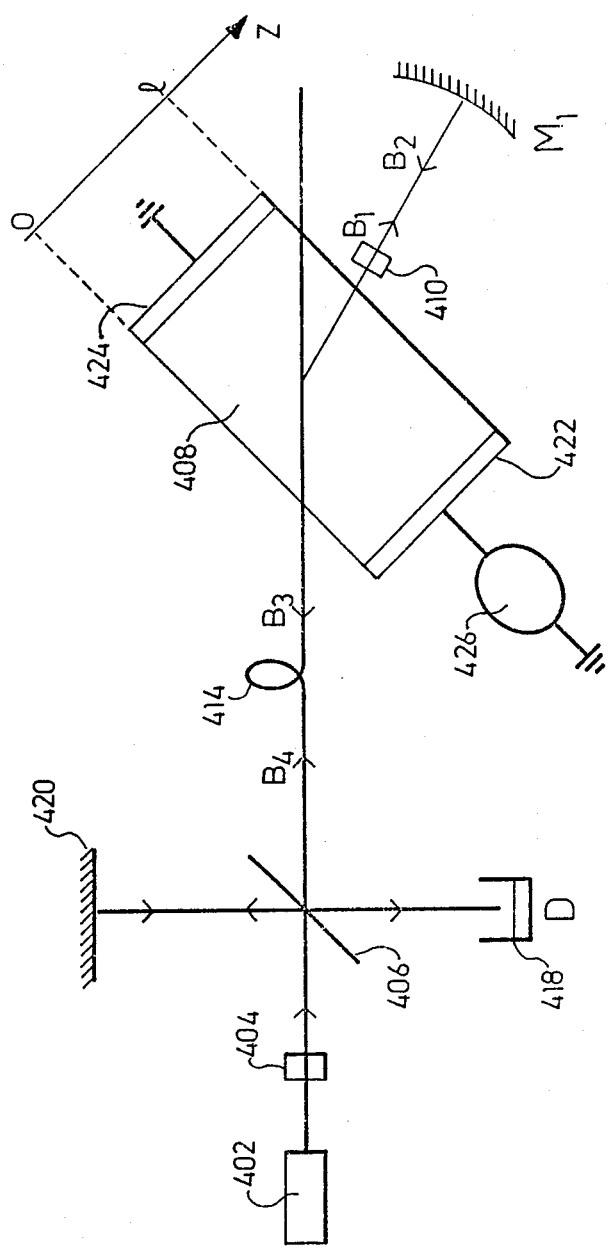

Solving Eq. 7 with the renormalized $\theta$ results in the plots of $\tau\delta(\theta)$ shown in FIG. 5 for values of $(Ln/\tau c)$ in the high $(L/\tau)$ region $(Ln/\tau c = 0.25, 0.5)$. The effect of the added factor is an enhancement of the detuning in the linear region. For values of $(Ln/\tau c)$ beyond 0.7 this characteristic behavior of $\tau\delta(\theta)$ changes.

Besides the explicit detuning dependence on the crystal and cavity parameters such as $\tau$, M and $\gamma_o$, the effect of an electric field in the crystal is interesting. An applied DC field adds a phase source in the cavity through its effect on the spatial phase between the gratings and the fringes of the mixing beams in the crystal. This affects the frequency shift of the oscillation. (See B. Fischer, and S. Sternklar, S. Weiss and B. Fischer, papers supra)

ADVANTAGES OF THE FIG. 1 EMBODIMENT

An attractive feature of the Ring PPC Gyro illustrated in FIG. 1 is its built in reciprocity. Besides the frequency detuning effect, the self-induced grating adjusts itself in a manner which insures spatial phase conjugation of the counter-propagating beams. Thus it is possible to use a multi-mode fiber as the ring cavity.

The detection of the detuning (frequency shift) is done by interfering the reflection beam $B_3$ from the ring 14 with the input beam $B_1$ at a screen or detector 18, as shown in FIG. 1 and as described above.

In an experiment, a Ring PPC was set up with a photorefractive crystal 8 of $BaTiO_3$ and with a 1 mm multi-mode fiber ring 14. The 488 mm line of an Argon ion laser with horizontal polarization (extraordinary polarization in the crystal) was used as the input beam $B_1$. The oscillation built up easily with proper coupling to the fiber, both with and without an etalon in the $A_r^+$ laser cavity. The polarization of the oscillation was maintained horizontal due to the much higher coupling efficiency for this component in $BaTiO_3$ crystal. A non-reciprocal phase was introduced in the ring via the Faraday effect. A magnetic field B of an electromagnet that was applied along a length L of the fiber produced a non-reciprocal phase (for the horizontal polarization) $\theta=2VBL'$, on the order of 0.2 rad, where V is the Verdet constant. Since $(\tau\delta)\sim\theta$ and $\tau\sim 1$ sec, $\delta\approx 0.2$ rad/sec. Fringe movement of similar frequency was indeed seen. These fringes at the dector 18 in FIG. 1 were of good quality as was reported for the linear PPC fiber interferometer (B. Fischer and S. Sternklar, article supra). For slowly responding crystals, noise and instability can degrade gyro performance greatly.

A particularly important advantage in the system illustrated in FIG. 1 is that a variety of adjustable parameters are available in this system for controlling and biasing. Thus the time constant that depends on the beams' intensity, the transmittivity of the ring M, and the magnitude of that depends on the orientation of the crystal, can serve to change the sensitivity as well as the linear range of the device. FIG. 1 illustrates this method of control by the provision of intensity control units 4, 10, controlled by circuit 28, for varying the intensity and polarization of the beams to thereby control the sensitivity of the apparatus. The sensitivity may be further controlled by adjusting the relative orientation and angles of the beams, and thereby the coupling coefficient of the crystal 8. Means for providing such adjustment is schematically indicated at 30 in FIG. 1.

Biasing the device by the application of an electric field on the crystal, as shown at 22, 24, 26 in FIG. 1, acts to change the complex coupling constant (B. Fischer article supra) and shifts the zero of the frequency shift.

A further advantage in the system of the present invention is that coherence is not a problem in the mixing process since each writing beam produces its own writing mate. Nor does the interferometric measurement scheme between the source beam $B_1$ and the reflected beam $B_3$ impose a constraint on the laser's coherence length. The ring length may be matched, for example, by a multi-mode fiber plus a linear PPC in the reference arm (B. Fischer and S. Sternklar, article supra).

From the foregoing, it will be seen that the system illustrated in FIG. 1 can also be used for measuring magnetic field intensity by having detector 18 (FIG. 1) which detects frequency shift, also include means for deriving from the measured frequency shift a measurement of the magnetic field to which the ring is subjected. In addition, the system illustrated in FIG. 1 may be used as a frequency shifter, by using control 26, 28 and/or 30 to produce a predetermined non-reciprocal phase-shift in the oscillating beams in order to shift the frequency of the source beam (laser 2); in this application, elements 6, 18 and 20 may be omitted.

EMBODIMENT OF FIGS. 3-6

The invention may also be implemented by the use of a two-wave mixer producing a single oscillating beam, rather than a four-wave mixer producing two counter-propagating oscillating beams as in FIG. 1. A two-wave mixer implementation is illustrated in FIG. 3, which implementation uses a ring of three mirrors making a closed loop on which unidirectional oscillations build up. Such an implementation can also use an optical fiber ring or a different number of mirrors.

Thus, the system illustrated in FIG. 3 includes a single pumping or source beam from a laser 102 which passes through a beam-splitter 106 to the optical-wave-mixer crystal 108, in this case a two-wave mixer. The beam in the ring (mirrors $M_1$-$M_3$) is thus an oscillating beam and undergoes a shift in frequency corresponding to the reciprocal and/or non-reciprocal phase-shifts produced by the rotation of the closed-loop optical path defined by these mirrors. This frequency shift may be measured by detector 118 in the same manner as described above with respect to FIG. 1, by interfering the reflected beam reflected to the detector by a second beam-splitter 120, with the source beam reflected to the detector by beam-splitter 106.

FIG. 4 illustrates another arrangment, similar to that of FIG. 1 in that it also includes a laser source 302 directing the pumping or source beam through a beam-splitter 304 to a four-wave mixer crystal 308, and from there via a coupling lens 312 to a fiber-optic ring 314. In the FIG. 4 arrangement, however, the input to the fiber ring 314 is provided by a beam-splitter 315 in front of the mixer medium 308. The reflected and counter-propagating oscillating beams in the fiber-optic ring 314 are detected as in FIG. 1. Here, the detection which may be of phase or by detuning, is done in unit 318, or in unit 340 which is composed of subunits similar to subunits 304, 318 and 320.

FIG. 5 illustrates another configuration where the closed loop consists of a linear cavity, with a mirror $M_1$ (or with another mirror in the opposite side of the crystal) not along the source beam. The single pumping or source beam $B_4$ may pass through a multimode fiber 414. Elements 402, 404, 406, 408, 410, 414, 418, 420, 422, 424, 426, and $B_1$-$B_4$ correspond to elements 2, 4, 6, 8, 10, 14, 18, 20, 22, 24, 26 and $B_1$-$B_4$, respectively, in FIG. 1.

The embodiments of FIGS. 3-5 may also include the bias control of the electro-static field in the mixer crystal, effected by electrodes 22, 24 and the bias control circuit 26 in FIG. 1, and also the intensity and/or polarization control arrangement in FIG. 1, including the control units 4, 10 and the control circuit 28.

It will be appreciated that the arrangements may also contain multimode fibers in their cavity (ring or linear) or in the path of the pumping or beam. They may also be composed or multistage four-wave mixers. One or more of the regular mirrors or the loop paths, replaced by wave mixers or phase conjugate mirrors.

It will be further appreciated that the detection may be of phase, and that the arrangements illustrated in FIGS. 3-5 may also be as frequency shifters and as phase shift and magnetic field intensity measuring devices.

While the invention has been described with respect to several preferred embodiments, it will be appreciated that many other variations, modifications and applications of the invention may be made.

What is claimed is:

1. Optical apparatus comprising:
   an optical system defining a closed-loop optical path;
   a light source producing a single pumping beam outside said closed-loop optical path;
   an optical-wave-mixer producing from said single pumping beam an oscillating beam in said closed-loop optical path;
   and means for measuring the phase or frequency shift produced in said oscillating beam by said optical-wave-mixer resulting from the non-reciprocal or reciprocal phase-shift thereof.

2. Apparatus according to claim 1, further including means for deriving from said measured frequency shift a measurement of the rotation of said closed-loop optical path.

3. Apparatus according to claim 1, further including means for deriving from said measured frequency shift a measurement of the magnetic field to which said closed-loop optical path is subjected.

4. Apparatus according to claim 1, wherein said optical-wave-mixer is a four-wave mixer and produces counter-propagating oscillating beams in said closed-loop optical path.

5. Apparatus according to claim 1, wherein said closed-loop optical path comprises an optical fiber.

6. Apparatus according to claim 5, wherein said optical fiber is a multi-mode fiber.

7. Apparatus according to claim 1, wherein said single pumping beam passes through said optical-wave-mixer in one direction and is fed back completely or partially to the said optical-wave-mixer.

8. Apparatus according to claim 1, wherein said single pumping beam passes through an optical fiber.

9. Apparatus according to claim 7, wherein said optical-wave-mixer is a four-wave mixer and produces counter-propagating oscillating beams in the closed-loop optical path.

10. Apparatus according to claim 1, wherein said optical-wave-mixer is a two-wave mixer producing from said single pumping beam a unidirectionally oscillating beam in said closed-loop optical path.

11. Apparatus according to claim 1, wherein said optical-wave-mixer is a photorefractive crystal.

12. Apparatus according to claim 11, including means for producing an electric field bias on said crystal to control the frequency shift.

13. Apparatus according to claim 11, further including means for controlling the intensity and/or polarization of said single pumping beam, to thereby control the sensitivity of the apparatus.

14. Apparatus according to claim 11, further including means for adjusting the relative orientation and angle of said single pumping beam and thereby the coupling coefficient of said crystal, to thereby control the sensitivity of the apparatus.

15. Apparatus according to claim 11, further including means for controlling the transmittivity and/or polarization of the single pumping beam in the closed-loop optical path and thereby the sensitivity of the apparatus.

16. Apparatus according to claim 1, wherein said light source is a laser.

17. Frequency shifter apparatus, comprising:
    an optical system defining a closed-loop optical path;
    a light source producing a single pumping beam outside said closed-loop optical path;
    an optical-wave-mixer producing from said single pumping beam an oscillating beam in said closed-loop optical path;
    and means for producing a predetermined reciprocal and/or non-reciprocal phase-shift in said oscillating beam in order to shift the frequency relative to said single pumping beam.

18. Apparatus according to claim 17, wherein said optical-wave-mixer is a four-wave mixer and produces counter-propagating oscillating beams in said closed-loop optical path.

19. Apparatus according to claim 17, wherein said closed-loop optical path comprises an optical fiber.

20. Apparatus according to claim 19, wherein said optical fiber is a multi-mode fiber.

21. Apparatus according to claim 17, wherein said single pumping beam passes through said optical-wave-mixer in one direction and is fed back completely or partially to the said optical-wave-mixer.

22. Apparatus according to claim 20, wherein said optical-wave-mixer is a four-wave mixer and produces counter-propagating oscillating beams in the closed-loop optical path.

23. Apparatus according to claim 17, wherein said single pumping beam passes through an optical fiber.

24. Apparatus according to claim 17, wherein said optical-wave-mixer is a two-wave mixer producing from said single pumping beam a unidirectionally oscillating beam in said closed-loop optical path.

25. Apparatus according to claim 17, wherein said optical-wave-mixer is a photorefractive crystal.

26. Apparatus according to claim 25, further including means for producing an electric field bias on said crystal to control the frequency shift.

27. Apparatus according to claim 25, further including means for controlling the intensity and/or polarization of said single pumping beam, to thereby control the sensitivity of the apparatus.

28. Apparatus according to claim 25, further including means for adjusting the relative orientation and angle of said single pumping beam and thereby the coupling coefficient of said crystal, to thereby control the sensitivity of the apparatus.

29. Apparatus according to claim 25, further including means for controlling the transmittivity and/or polarization of the single pumping beam in the closed-loop optical path and thereby the sensitivity of the apparatus.

30. Apparatus according to claim 17, wherein said light source is a laser.

* * * * *